(12) United States Patent
Robinson

(10) Patent No.: US 7,810,971 B2
(45) Date of Patent: Oct. 12, 2010

(54) REMOTELY DEPLOYABLE VEHICLE LIGHT APPARATUS

(75) Inventor: Tony C. Robinson, P.O. Box 700, 115 N. Main St., Beaver, UT (US) 84713

(73) Assignee: Tony C. Robinson, Beaver, UT (US)

( * ) Notice: Subject to any disclaimer, the term of this patent is extended or adjusted under 35 U.S.C. 154(b) by 131 days.

(21) Appl. No.: 12/220,596

(22) Filed: Jul. 26, 2008

(65) Prior Publication Data

US 2009/0059613 A1     Mar. 5, 2009

Related U.S. Application Data

(60) Provisional application No. 60/961,984, filed on Jul. 26, 2007.

(51) Int. Cl.
*B60Q 1/24*     (2006.01)

(52) U.S. Cl. .................. 362/486; 362/524; 362/423

(58) Field of Classification Search .............. 362/486, 362/523, 524, 233, 287, 423, 419, 428, 493
See application file for complete search history.

(56) References Cited

U.S. PATENT DOCUMENTS

| | | | |
|---|---|---|---|
| 4,192,427 A | 3/1980 | Bergman | |
| 4,488,209 A * | 12/1984 | Gosswiller | 362/486 |
| 4,722,030 A | 1/1988 | Bowden | |
| 4,779,168 A | 10/1988 | Montgomery | |
| 5,195,813 A | 3/1993 | Brown | |
| 5,207,747 A * | 5/1993 | Gordin et al. | 362/233 |
| 5,450,296 A | 9/1995 | McHugh | |
| 5,980,070 A * | 11/1999 | Hulse et al. | 362/385 |
| 2004/0008520 A1 * | 1/2004 | Huang | 362/524 |
| 2008/0060822 A1 * | 3/2008 | Salmi et al. | 169/24 |

* cited by examiner

*Primary Examiner*—Jong-Suk (James) Lee
*Assistant Examiner*—Peggy A. Neils

(57) ABSTRACT

A remotely deployable vehicle light apparatus includes a support which is connected to a vehicle. A remotely-controlled light assembly deployment mechanism is connected to the support. One or more light assemblies are connected to the light assembly deployment mechanism. A remote control unit is provided for controlling the remotely-controlled light assembly deployment mechanism. Preferably, a second light assembly is included for providing a pair of light assemblies. Generally, the light assembly deployment mechanism provides for adjustable vertical deployment of the light assemblies up and down in a vertical plane. Also, a remotely-controlled light assembly rotation mechanism can be provided for rotating light assemblies. Generally, the light assembly rotation mechanism provides for rotation of the light units in a horizontal plane.

9 Claims, 4 Drawing Sheets

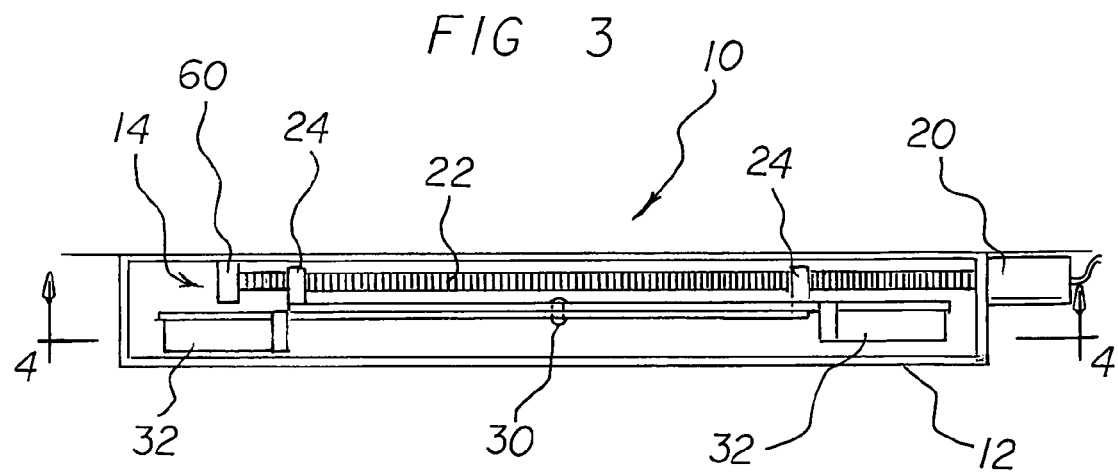
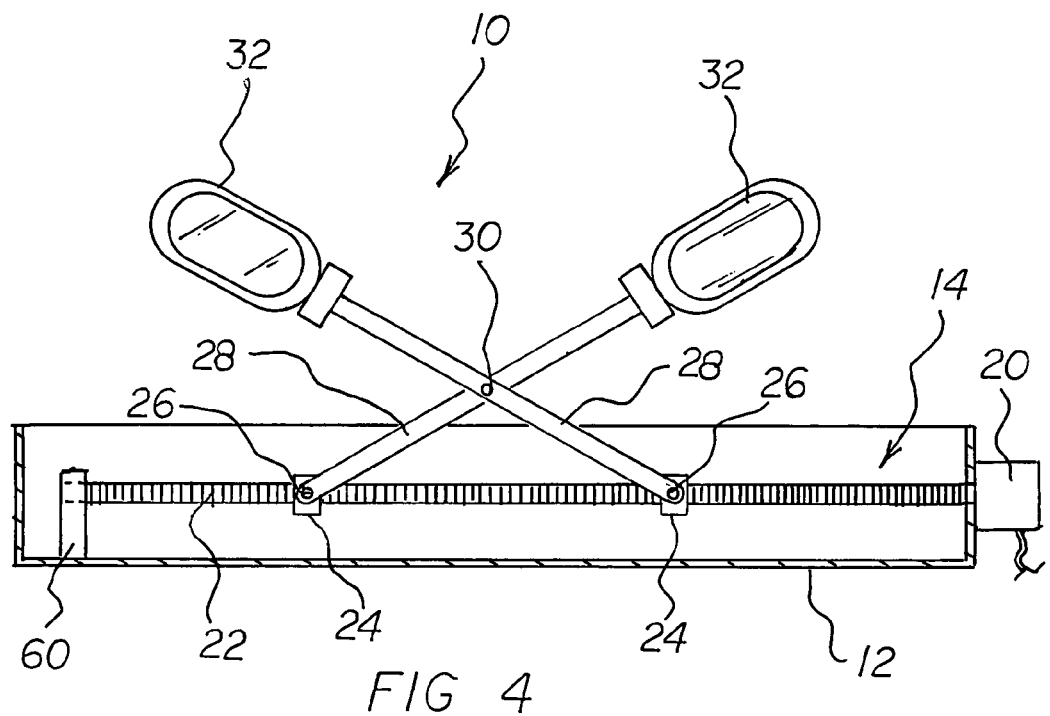

FIG 7
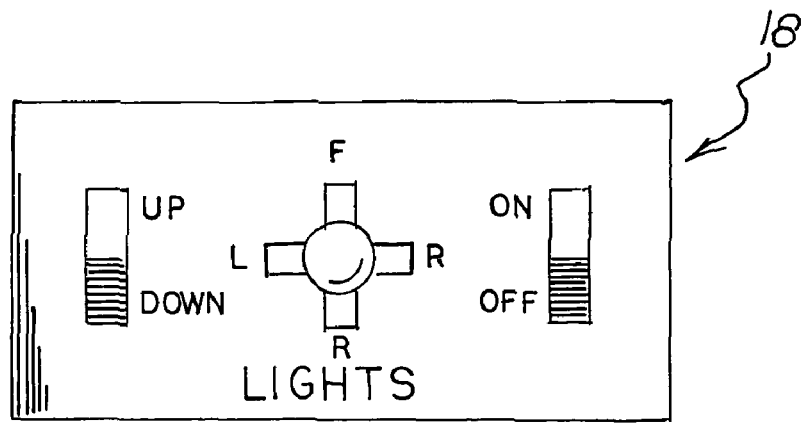
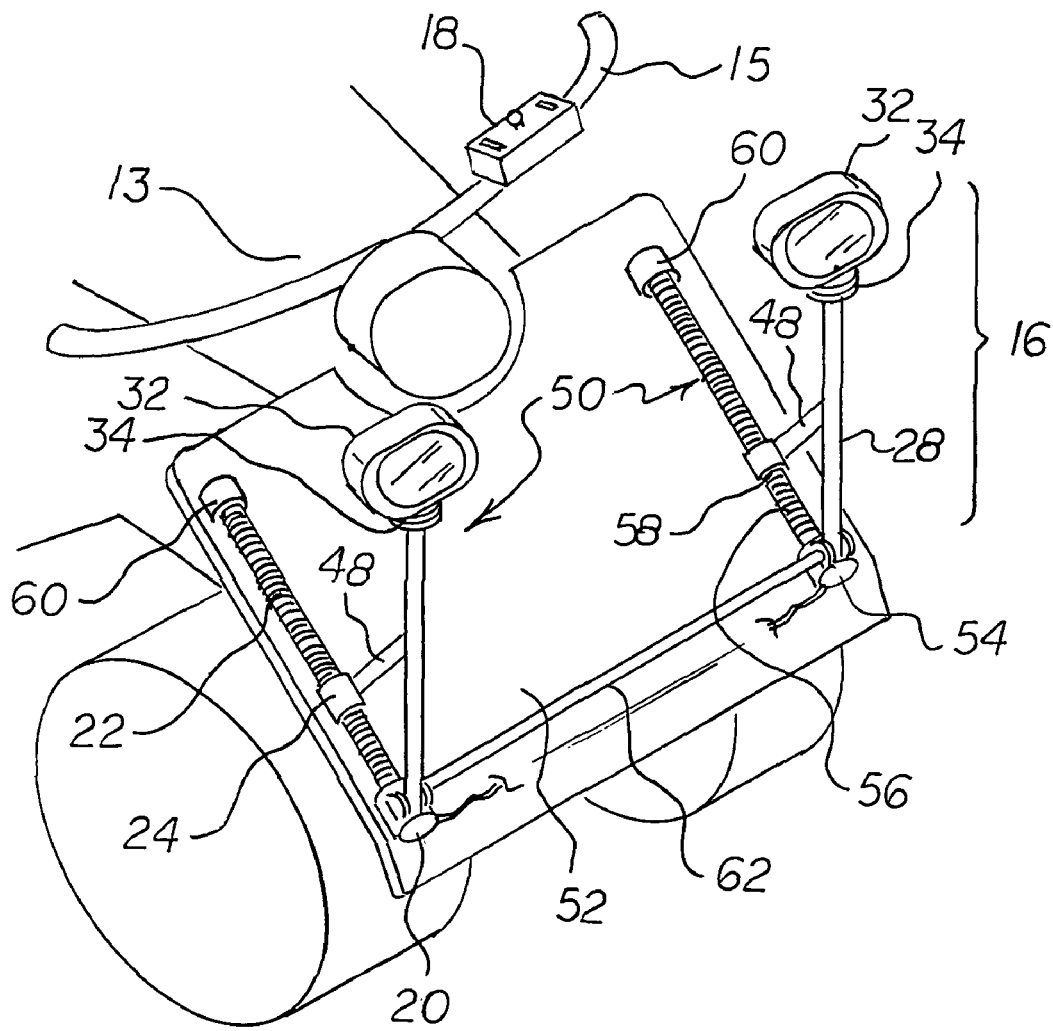
FIG 8

REMOTELY DEPLOYABLE VEHICLE LIGHT APPARATUS

CROSS-REFERENCE TO RELATED APPLICATION

This application claims priority based upon my Provisional Application Ser. No. 60/961,984; filed Jul. 26, 2007.

BACKGROUND OF THE INVENTION

1. Field of the Invention

The present invention relates generally to light assemblies, and, more particularly, to auxiliary light assemblies especially adapted for use on vehicles.

2. Description of the Prior Art

Providing auxiliary lights on vehicles, such as trucks and ATVs, is well known in the art. In this respect, throughout the years, a number of innovations have been developed relating to auxiliary lights on trucks, and the following patents are representative of some of those innovations; U.S. Pat. Nos. 4,192,427, 4,722,030, 4,779,168, 5,195,813, and 5,450,296.

More specifically, U.S. Pat. No. 4,192,427 discloses a tow truck light support that includes a torsion bar and handle for operating the torsion bar for positioning a light support. Since the use of a torsion bar requires proper torsioning of the torsion bar, and since proper torsioning of a torsion bar requires a special instrument for measuring torque or torsion, it would be desirable if a support for tow truck lights does not employ a torsion bar.

Each of U.S. Pat. Nos. 4,722,030, 4,779,168, 5,195,813, and 5,450,296 discloses a vehicular light bar that includes lights that can be rotated in a horizontal plane. However, this light bar does not provide for moving lights up and down in a vertical plane. In this respect, it would be desirable if a support for vehicular lights were provided which permits adjustment of the lights up and down in a vertical plane.

In addition, it would be desirable if a remotely deployable vehicle light apparatus were provided which provides adjustment of lights both up and down in a vertical plane and rotation of the lights in a horizontal plane.

Still other features would be desirable in a remotely deployable vehicle light apparatus. For example, when plural auxiliary lights are employed, it would be desirable if individual auxiliary lights can be adjusted together or independently or each other.

Thus, while the foregoing body of prior art indicates it to be well known to use auxiliary lights on vehicles, the prior art described above does not teach or suggest a remotely deployable vehicle light apparatus which has the following combination of desirable features: (1) does not employ a torsion bar; (2) permits adjustment of the lights up and down in a vertical plane; (3) provides adjustment of lights both up and down in a vertical plane and provides rotation of the lights in a horizontal plane; and (4) provides individual auxiliary lights that can be adjusted together or independently or each other.

The foregoing desired characteristics are provided by the unique remotely deployable vehicle light apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a remotely deployable vehicle light apparatus which includes a support which is connected to a vehicle. A remotely-controlled light assembly deployment mechanism is connected to the support. One or more light assemblies are connected to the light assembly deployment mechanism. A remote control unit is provided for controlling the remotely-controlled light assembly deployment mechanism. Preferably, a second light assembly is included for providing a pair of light assemblies. Generally, the light assembly deployment mechanism provides for adjustable vertical deployment of the light assemblies up and down in a vertical plane.

In accordance with the first embodiment of the invention, the support includes a housing which is connected to a vehicle. The remotely-controlled light assembly deployment mechanism is connected to the housing.

The remotely-controlled light assembly deployment mechanism can include a remotely-controlled first worm drive motor that is connected to the housing. A worm gear is connected to the remotely-controlled first worm drive motor. A worm gear end bearing is connected to an end of the worm gear. A rider gear is connected to the worm gear. The rider gear includes a rider hinge pin, and a light assembly is connected to the rider hinge pin.

Preferably, a light assembly includes a light unit support shaft which is connected to the rider hinge pin. A direction reversing fulcrum is connected to the light unit support shaft, distal from the rider hinge pin; and a light unit is supported on the light unit support shaft. A remotely-controlled light assembly rotation mechanism is supported by the light unit support shaft and is connected to the light unit for rotating the light unit by remote control. Generally, the light assembly rotation mechanism provides for rotation of the light units in a horizontal plane.

The remotely-controlled light assembly rotation mechanism can include a remotely-controlled rotation control motor. An externally toothed gear is connected to the remotely-controlled rotation control motor. A rotation mechanism housing supports the light unit. An internally toothed gear is connected to the rotation mechanism housing. The externally toothed gear is meshed with the internally toothed gear.

A remotely-controlled receiver is connected to remotely-controlled rotation control motor, and batteries are electrically connected to the remotely-controlled receiver for powering the remotely-controlled receiver and the remotely-controlled rotation control motor.

In accordance with the second embodiment of the invention, the support includes a planar support base.

A remotely-controlled second worm drive motor is supported by the planar support base. A second worm gear is connected to the planar support base. A second rider gear is connected to the second worm gear, and a pair of direction reversing links are connected respectively between the second rider gear and a second light assembly and between the rider gear on the worm gear and a first light assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remotely deployable vehicle light apparatus which has all of the advantages of the prior art and none of the disadvantages.

It is another object of the present invention to provide a new and improved remotely deployable vehicle light apparatus which may be easily and efficiently manufactured and marketed.

It is a further object of the present invention to provide a new and improved remotely deployable vehicle light apparatus which is of durable and reliable construction.

An even further object of the present invention is to provide a new and improved remotely deployable vehicle light apparatus which is susceptible of a low cost of manufacture with regard to both materials and labor, and which accordingly is then susceptible of low prices of sale to the consuming public, thereby making such remotely deployable vehicle light apparatus available to the buying public.

Still yet a further object of the present invention is to provide a new and improved remotely deployable vehicle light apparatus which does not employ a torsion bar.

Still another object of the present invention is to provide a new and improved remotely deployable vehicle light apparatus that permits adjustment of the lights up and down in a vertical plane.

Yet another object of the present invention is to provide a new and improved remotely deployable vehicle light apparatus which provides adjustment of lights both up and down in a vertical plane and rotation of the lights in a horizontal plane.

Even another object of the present invention is to provide a new and improved remotely deployable vehicle light apparatus that provides individual auxiliary lights that can be adjusted together or independently of each other.

These together with still other objects of the invention, along with the various features of novelty which characterize the invention, are pointed out with particularity in the claims annexed to and forming a part of this disclosure. For a better understanding of the inventions its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a top view of the embodiment of the remotely deployable vehicle light apparatus of FIG. 2 taken along line 3-3 thereof.

FIG. 4 is a cross-sectional view of the embodiment of the invention shown in FIG. 3 taken along line 4-4 thereof, wherein the embodiment of the invention is shown in a deployed condition.

FIG. 7 is a top view of a remote control unit used for controlled various embodiments of the invention.

FIG. 8 is an elevated perspective view of a second embodiment of the remotely deployable vehicle light apparatus of the invention, which is installed on an all terrain vehicle (ATV).

DESCRIPTION OF THE PREFERRED EMBODIMENT

Figure 1:
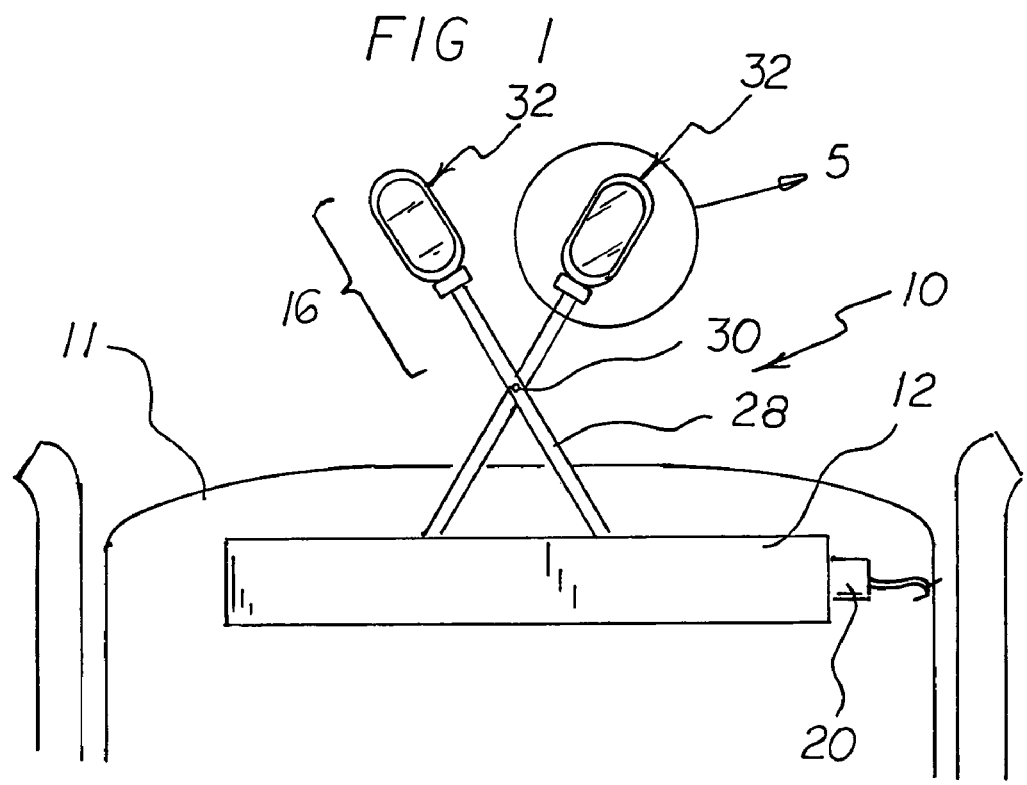
FIG. 1 is a rear view showing a first embodiment of the remotely deployable vehicle light apparatus of the invention, in a deployed condition which is also an extended condition.

With reference to the drawings, a new and improved remotely deployable vehicle light apparatus embodying the principles and concepts of the present invention will be described.

With reference to the drawings, a new and improved remotely deployable vehicle light apparatus embodying the principles and concepts of the present invention will be described.

Turning to FIGS. 1-7, there is shown a first embodiment of the remotely deployable vehicle light apparatus of the invention generally designated by reference numeral 10. In each of the figures, reference numerals are shown that correspond to like reference numerals that designate like elements shown in other figures.

In the first embodiment, remotely deployable vehicle light apparatus 10 includes a support which is connected to a vehicle. A remotely-controlled light assembly deployment mechanism 14 is connected to the support. One or more light assemblies 16 are connected to the light assembly deployment mechanism 14. A remote control unit 18 is provided for controlling the remotely-controlled light assembly deployment mechanism 14.

The apparatus of the invention can be used on land vehicles as well as boats. The subject apparatus is especially helpful for directing light behind a vehicle that is backing up. Preferably, a second light assembly 16 is included for providing a pair of light assemblies 16.

Figure 2:
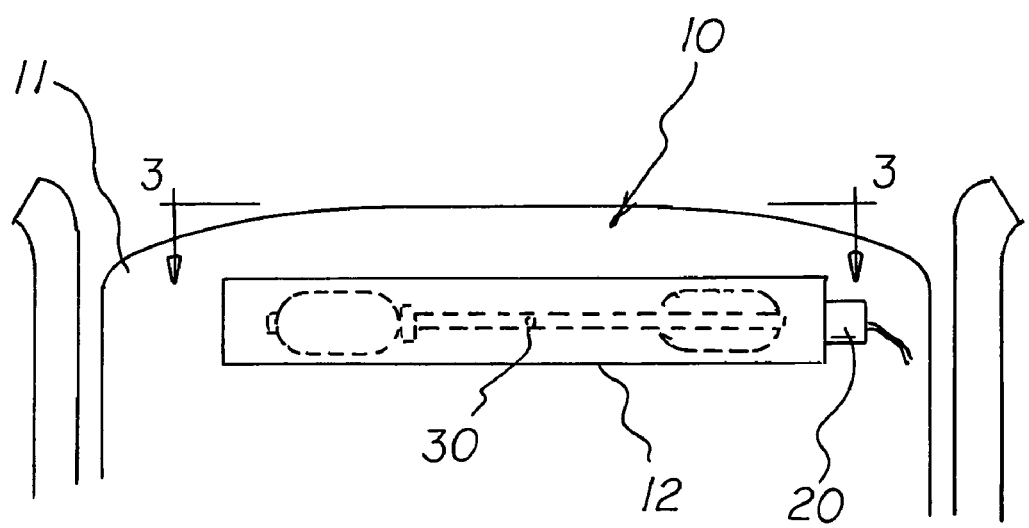
FIG. 2 is a rear view showing the first embodiment of the remotely deployable vehicle light apparatus of the invention, in a non-deployed condition which is also a retracted condition.
Figure 5:
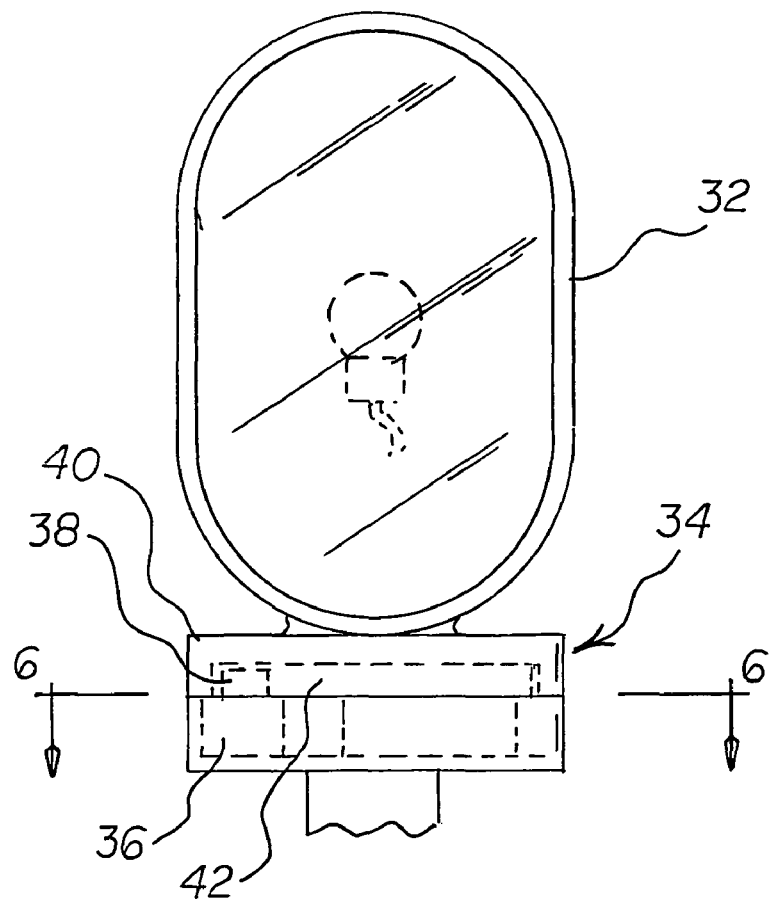
FIG. 5 is an enlarged view of the portion of the embodiment of the invention shown in FIG. 1 which is contained in circled region 5.
Figure 6:
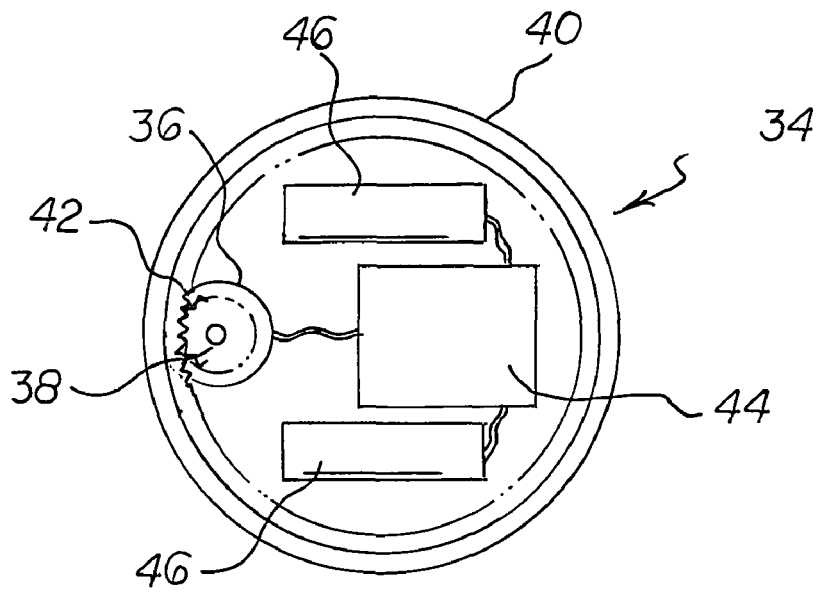
FIG. 6 is a cross-sectional view of the portion of the embodiment of the invention shown in FIG. 5, taken along line 6-6 thereof.

In accordance with the first embodiment 10 of the invention, the support includes a housing 12 which is connected to a vehicle. With the first embodiment of the invention, the housing 12 can be connected to an outer back wall of a cab of a truck 11, as shown in FIGS. 1 and 2. In this respect, the remote control unit 18 can be placed inside the vehicle cab, such as on a dashboard.

The housing 12 can have a relatively small width and small height, so that it does not obstruct the user's field of vision when the remotely deployable vehicle light apparatus is either deployed or non-deployed. The remotely-controlled light assembly deployment mechanism 14 is connected to the housing 12.

The remotely-controlled light assembly deployment mechanism 14 can include a remotely-controlled first worm drive motor 20 that is connected to the housing 12. A worm gear 22 is connected to the remotely-controlled first worm drive motor 20. A worm gear end bearing 60 is connected to an end of the worm gear 22. A rider gear 24 is connected to the worm gear 22. The rider gear 24 includes a rider hinge pin 26, and a light assembly 16 is connected to the rider hinge pin 26.

If desired, the remote control unit 18 can be directly wired to the remotely-controlled first worm drive motor 20, or the remote control unit 18 can operate by wireless remote control.

The remotely-controlled first worm drive motor 20 can be powered by either the vehicle battery or by dedicated batteries.

Preferably, a light assembly 16 includes a light unit support shaft 28 which is connected to the rider hinge pin 26. A direction reversing fulcrum 30 is connected to the light unit support shaft 28, distal from the rider hinge pin 26; and a light unit 32 is supported on the light unit support shaft 28. A remotely-controlled light assembly rotation mechanism 34 is supported by the light unit support shaft 28 and is connected to the light unit 32 for rotating the light unit 32 by remote control.

The remotely-controlled light assembly rotation mechanism 34 can include a remotely-controlled rotation control motor 36. An externally toothed gear 38 is connected to the remotely-controlled rotation control motor 36. A rotation mechanism housing 40 supports the light unit 32. An internally toothed gear 42 is connected to the rotation mechanism housing 40. The externally toothed gear 38 is meshed with the internally toothed gear 42.

A remotely-controlled receiver 44 is connected to remotely-controlled rotation control motor 36, and batteries 46 are electrically connected to the remotely-controlled receiver 44 for powering the remotely-controlled receiver 44 and the remotely-controlled rotation control motor 36.

The operation of the first embodiment 10 of the remotely deployable vehicle light apparatus of the invention is described below.

The housing 12 is attached to the back of a cab of a truck 11. The remote control unit 18 is contained inside the cab of the truck 11. When the operator remotely activates the remotely-controlled first worm drive motor 20, the remotely-controlled first worm drive motor 20 drives the worm gear 22. As the worm gear 22 turns in a deployment direction, the rider gears 24 ride along the worm gear 22. More specifically, the thread direction of the rider gear 24 proximal to the remotely-controlled first worm drive motor 20 is opposite to the thread direction of the rider gear 24 distal to the remotely-controlled first worm drive motor 20. As a result, when the worm gear 22 rotates in the deployment direction, the proximal and distal rider gears 24 move toward each other. In doing so, the pair of light assemblies 16 rotate around respective rider hinge pins 26 and rotate around a common direction reversing fulcrum 30. The degree of vertical deployment of the light assemblies 16 is greater for the vertical deployment shown in FIG. 1 than for the vertical deployment shown in FIG. 4. Generally, the light assembly deployment mechanism 14 provides for adjustable vertical deployment of the light assemblies 16 up and down in a vertical plane.

Once the desired degree of vertical deployment is attained, the respective light units 32 can be rotated by the light assembly rotation mechanism 34 in order to aim the light units 32 in desired directions. More specifically, the remote control unit 18 is operated so that the remotely-controlled receiver 44 controls the remotely-controlled rotation control motor 36 which operates the externally toothed gear 38 which meshes with the internally toothed gear 42 which turns the light units 32. With one direction of rotation, the light units 32 are rotated clockwise. With an opposite direction of rotation, the light units 32 are rotated counterclockwise. Generally, the light assembly rotation mechanism 34 provides for rotation of the light units 32 in a horizontal plane.

The remotely-controlled first worm drive motor 20 is controlled to turn in a non-deployment direction to reverse the movement of the light assemblies 16 and return the light assemblies 16 to the housing in the non-deployment condition.

In accordance with the second embodiment 50 of the invention, the support includes a planar support base 52. With the second embodiment 50 of the invention, as shown in FIG. 8, the planar support base 52 can be connected to the front rack of an all terrain vehicle 13. In addition, the remote control unit 18 can be connected to the handlebars 15 of the all terrain vehicle 13. The remote control unit 18 can be placed near a hand grip of the handlebars 15 so that a user does not need to take a hand off of the handlebars 15 in order to operate the remote control unit 18. If desired, the remote control unit 18 can be directly wired to the remotely-controlled first worm drive motor 20 and the remotely-controlled second worm drive motor 54, or the remote control unit 18 can operate by wireless remote control.

A remotely-controlled second worm drive motor 54 is supported by the planar support base 52. A second worm gear 56 is connected to the planar support base 52. A second rider gear 58 is connected to the second worm gear 56, and a pair of direction reversing links 48 are connected respectively between the second rider gear 58 and a second light assembly 16 and between the rider gear 24 on the worm gear 22 and a first light assembly 16.

With the second embodiment 50 of the invention, the remote control unit 18 can be used to control each of the pair of light units 32 independently of each other in vertical planes. More specifically, the remotely-controlled first worm drive motor 20 is used to control one worm gear 22, one rider gear 24, one direction reversing link 48, and one light assembly 16 for vertical deployment thereof. As the rider gear 24 moves toward the remotely-controlled first worm drive motor 20, the rider gear 24 lifts the attached direction reversing link 48 in an upward direction, thereby deploying the attached light assembly 16. Conversely, when the rider gear 24 moves away from the remotely-controlled first worm drive motor 20, the attached direction reversing link 48 pulls the attached light assembly 16 to a horizontal, non-deployed condition in the vertical plane.

Also, the remote control unit 18 can be used to control the rotation of one light unit 32 independently of the other light unit 32.

In addition, the remotely-controlled second worm drive motor 54 is used to control the second worm gear 56, which drives the second rider gear 58, which moves a second direction reversing link 48, which operates a second light assembly 16 for deployment thereof, in a manner similar to deployment of the first light assembly 16.

Clearly, in FIG. 8 it is seen that a pair of light assemblies 16 are controlled by the pair of remotely-controlled worm drive motors, the pair of worm gears, the pair of rider gears, and the pair of direction reversing links. A connecting bar 62 can be connected between the pair of remotely-controlled worm drive motors 20 and 54.

If desired, only one remotely-controlled first worm drive motor 20 need be used, and a connecting shaft can be used for connecting the pair of light assemblies 16 together so that they deploy and retract together.

By using the remotely deployable vehicle light apparatus of the invention. A vehicle need not be moved in order to direct light to an object distant from the vehicle.

The components of the remotely deployable vehicle light apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved remotely deployable vehicle light apparatus that is low in cost, relatively simple in design and operation, and which may advantageously be used without employing a torsion bar. With the invention, a remotely deployable vehicle light apparatus is provided which permits adjustment of the lights up and down in a vertical plane. With the invention, a remotely deployable vehicle light apparatus provides adjustment of lights both up and down in a vertical plane and rotation of the lights in a horizontal plane. With the invention, a remotely deployable vehicle light apparatus provides individual auxiliary lights that can be adjusted together or independently or each other.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A remotely deployable vehicle light apparatus, comprising:
   a support connected to a vehicle,
   a remotely-controlled light assembly deployment mechanism connected to said support,
   a light assembly connected to said light assembly deployment mechanism, wherein said light assembly deployment mechanism provides for adjustable deployment of said light assembly up and down in a vertical plane, and
   a remote control unit for controlling said remotely-controlled light assembly deployment mechanism,
   wherein said remotely-controlled light assembly deployment mechanism is connected to said support, and
   wherein said remotely-controlled light assembly deployment mechanism includes:
   a remotely-controlled first worm drive motor connected to said support,
   a worm gear connected to said remotely-controlled first worm drive motor,
   a worm gear end bearing connected to an end of said worm gear, and
   a rider gear connected to said worm gear, wherein said rider gear includes a rider hinge pin, and wherein said light assembly is connected to said rider hinge pin.

2. The apparatus of claim 1, further including:
   a second light assembly for providing a pair of light assemblies.

3. The apparatus of claim 1 wherein said light assembly includes:
   a light unit support shaft connected to said rider hinge pin,
   a direction reversing fulcrum connected to said light unit support shaft, distal from said rider hinge pin, and
   a light unit supported on said light unit support shaft.

4. The apparatus of claim 3, further including:
   a remotely-controlled light assembly rotation mechanism supported by said light unit support shaft and connected to said light unit for rotating said light unit by remote control, wherein said light assembly rotation mechanism provides for rotation of said light unit in a horizontal plane.

5. The apparatus of claim 4 wherein said remotely-controlled light assembly rotation mechanism includes:
   a remotely-controlled rotation control motor,
   an externally toothed gear connected to said remotely-controlled rotation control motor,
   a rotation mechanism housing which supports said light unit, and
   an internally toothed gear connected to said rotation mechanism housing, wherein said externally toothed gear is meshed with said internally toothed gear.

6. The apparatus of claim 4, further including:
   a remotely-controlled receiver connected to remotely-controlled rotation control motor, and
   batteries electrically connected to said remotely-controlled receiver for powering said remotely-controlled receiver and said remotely-controlled rotation control motor.

7. The apparatus of claim 1 wherein said support includes a planar support base.

8. The apparatus of claim 7, further including:
   a remotely-controlled second worm drive motor supported by said planar support base,
   a second worm gear connected to said planar support base,
   a second rider gear connected to said second worm gear, and
   a pair of direction reversing links connected respectively between said second rider gear and a second light assembly and said rider gear on said worm gear and a first light assembly.

9. The apparatus of claim 1 wherein said support includes a housing adapted to receive said light assembly when deployed down in a vertical plane.

* * * * *